United States Patent
Kim et al.

(10) Patent No.: US 11,162,656 B2
(45) Date of Patent: Nov. 2, 2021

(54) PUDDLE LAMP FOR VEHICLE

(71) Applicant: SL Corporation, Daegu (KR)

(72) Inventors: Yong Hwan Kim, Gyengsangbuk-do (KR); Won Bin Kim, Gyengsangbuk-do (KR)

(73) Assignee: SL Corporation, Daegu (KR)

( * ) Notice: Subject to any disclaimer, the term of this patent is extended or adjusted under 35 U.S.C. 154(b) by 181 days.

(21) Appl. No.: 16/685,833

(22) Filed: Nov. 15, 2019

(65) Prior Publication Data
US 2020/0166191 A1 May 28, 2020

(30) Foreign Application Priority Data
Nov. 27, 2018 (KR) .......................... 10-2018-0148201

(51) Int. Cl.
| | |
|---|---|
| *B60Q 1/26* | (2006.01) |
| *F21S 41/20* | (2018.01) |
| *F21S 41/29* | (2018.01) |
| *F21S 41/40* | (2018.01) |
| *F21W 102/40* | (2018.01) |

(52) U.S. Cl.
CPC ............. *F21S 41/285* (2018.01); *F21S 41/29* (2018.01); *F21S 41/40* (2018.01); *F21W 2102/40* (2018.01)

(58) Field of Classification Search
CPC . B60Q 1/323; B60Q 2400/40; B60Q 2400/50
See application file for complete search history.

(56) References Cited

U.S. PATENT DOCUMENTS

| | | | | |
|---|---|---|---|---|
| 3,678,635 | A * | 7/1972 | Vagi ..................... | B60Q 1/2653 52/28 |
| 8,007,148 | B2 * | 8/2011 | Yamauchi ............ | B60Q 1/2642 362/501 |
| 10,576,893 | B1 * | 3/2020 | Salter ..................... | G03B 17/54 |
| 10,738,960 | B1 * | 8/2020 | Hellin Navarro ...... | B60Q 1/323 |
| 2005/0174791 | A1 * | 8/2005 | Bynum ................... | B60Q 3/74 362/490 |
| 2011/0273671 | A1 * | 11/2011 | Chu ....................... | G03B 21/14 353/13 |
| 2015/0224919 | A1 * | 8/2015 | Sobecki ............... | B60Q 1/2615 353/13 |

(Continued)

FOREIGN PATENT DOCUMENTS

| | | |
|---|---|---|
| KR | 1020090008651 A | 1/2009 |
| KR | 1020140109757 A | 9/2014 |
| KR | 101882907 B1 | 7/2018 |

*Primary Examiner* — Andrew J Coughlin
(74) *Attorney, Agent, or Firm* — Nelson Mullins Riley & Scarborough LLP; Kongsik Kim, Esq.

(57) ABSTRACT

The puddle lamp for a vehicle includes a collimating unit for collimating light emitted from a light source unit; a logo mask having a predetermined pattern that includes a region through which the light is transmitted and a region through which the light is obstructed; an image forming unit for forming an image corresponding to the pattern by the light that passes through the logo mask from the collimating unit; and a holder in which the collimating unit and the image forming unit are assembled. The image forming unit includes a lens assembly in which a plurality of lenses are stacked and assembled, and the lens assembly includes a first lens and a second lens disposed on and coupled to the first lens via at least one fastening portion that extends from the first lens.

15 Claims, 21 Drawing Sheets

(56) References Cited

U.S. PATENT DOCUMENTS

| | | | |
|---|---|---|---|
| 2016/0356450 A1* | 12/2016 | McClelland | B60Q 3/60 |
| 2017/0158120 A1* | 6/2017 | McClelland | F21V 14/00 |
| 2017/0329210 A1* | 11/2017 | Zawacki | B60Q 1/56 |
| 2019/0137677 A1* | 5/2019 | Cox | G02B 6/0006 |

* cited by examiner

PUDDLE LAMP FOR VEHICLE

CROSS-REFERENCE TO RELATED APPLICATION

This application claims the benefit of priority from Korean Patent Application No. 10-2018-0148201 filed on Nov. 27, 2018, which application in its entirety is herein incorporated by reference.

BACKGROUND

1. Technical Field

The present disclosure relates to a puddle lamp for a vehicle, and more particularly, to a puddle lamp for a vehicle that irradiates light to a ground around the vehicle to ensure visibility for boarding and deboarding.

2. Description of the Related Art

Generally, a vehicle is equipped with various types of vehicle lamps having an illumination function for confirming an object positioned in the vicinity of the vehicle in low-light conditions (e.g., nighttime driving), and a signal function for notifying other vehicles or road users of the operating state of the vehicle. For example, the main purpose of head lamps and fog lamps is the illumination function, and the main purpose of turn signal lamps, tail lamps, brake lamps, or side markers is the signal function. Such lamps are stipulated by laws and regulations for their installation standards and specifications to allow each function to be fully utilized.

Recently, a puddle lamp that irradiates light on a ground around a vehicle or a vehicle body is mounted on a side mirror of the vehicle to provide a driver or a passenger with illumination when boarding and deboarding. Since the puddle lamp is installed in a narrow space such as the side mirror of the vehicle, components of the puddle lamp need to be reduced in size. Accordingly, it requires a significant amount of time when assembling the puddle lamp.

Therefore, there is a demand for a method for enabling easy assembly of the puddle lamp and reducing the assembly time.

SUMMARY

Aspects of the present disclosure provide a puddle lamp for a vehicle that may couple some components of the puddle lamp before assembly of the puddle lamp to prevent the components of the puddle lamp from being separated before the assembly of the puddle lamp, thereby allowing the overall assembly process to be simplified while reducing the amount of time required for assembly of the puddle lamp.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a puddle lamp for a vehicle may include a collimating unit for collimating light emitted from a light source unit; a logo mask having a predetermined pattern that includes a region through which the light is transmitted and a region through which the light is obstructed; an image forming unit for forming an image corresponding to the pattern by the light that passes through the logo mask from the collimating unit; and a holder in which the collimating unit and the image forming unit are assembled. The image forming unit may include a lens assembly in which a plurality of lenses are stacked and assembled, and the lens assembly may include a first lens and a second lens that is disposed on and coupled to the first lens via at least one fastening portion that extends from the first lens.

Other features and exemplary embodiments may be apparent from the following detailed description, the drawings, and the claims.

A puddle lamp for a vehicle according to exemplary embodiments of the present disclosure as described above may have one or more of the following benefits. By coupling some components of the puddle lamp to prevent them from being separated from each other prior to the assembly of the puddle lamp, the overall assembly process may be simplified, and the assembly time may be decreased.

The benefits of the present disclosure are not limited to the above-mentioned benefits, and other benefits not mentioned may be understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
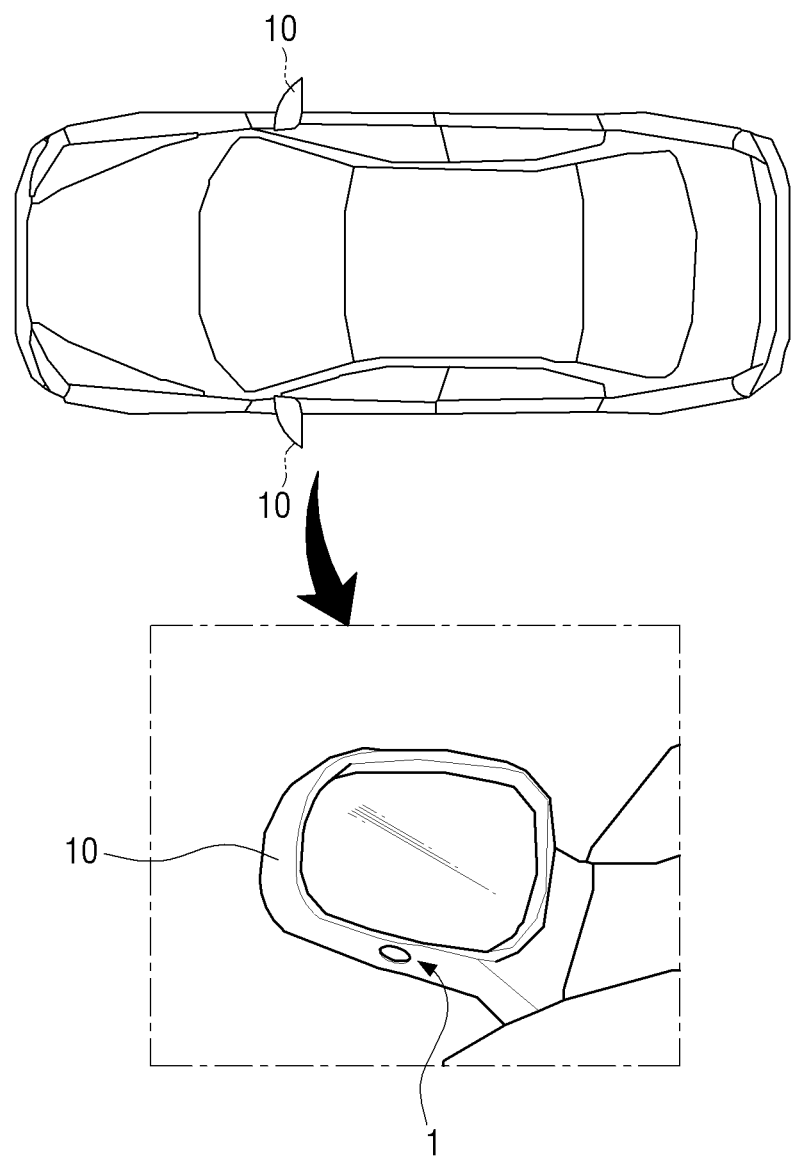
FIG. 1 is a schematic view showing a side mirror mounted with a puddle lamp for a vehicle according to an exemplary embodiment of the present disclosure.

Advantages and features of the present disclosure and methods of accomplishing the same may be understood more readily by reference to the following detailed description of preferred exemplary embodiments and the accompanying drawings. The present disclosure, however, may be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Exemplary embodiments of the present disclosure are described herein with reference to plan and cross-section illustrations that are schematic illustrations of idealized exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a puddle lamp for a vehicle according to exemplary embodiments of the present disclosure.

FIG. 1 is a schematic view showing a side mirror illustrated with a puddle lamp for a vehicle according to an exemplary embodiment of the present disclosure. Referring to FIG. 1, a puddle lamp 1 for a vehicle according to an exemplary embodiment of the present disclosure may be installed within or near a side mirror 10 of a driver side (e.g., left side) and a passenger side (e.g., right side) of the vehicle to irradiate light to the ground around the vehicle or a vehicle body, thereby serving to improve visibility for a driver and/or a passenger when boarding (e.g., getting on) and/or deboarding (e.g., getting off) in low-light conditions.

In addition to irradiating light to the ground around the vehicle or the vehicle body, thereby serving to improve visibility for boarding and deboarding, the puddle lamp 1 for the vehicle may display an image such as a logo (e.g., emblem, trademark, symbol, or sign) that may represent a unique identity of the vehicle when irradiating light onto the ground around the vehicle or the vehicle body in order to provide a luxurious brand image and to improve merchantable quality of the vehicle.

Figure 2:
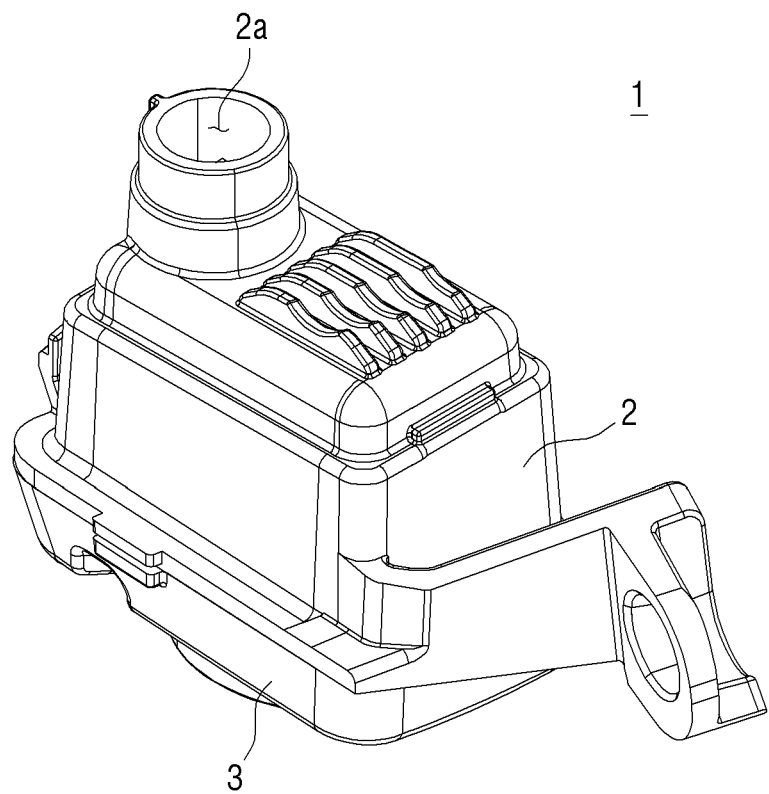
FIG. 2 is a perspective view showing the appearance of a puddle lamp for a vehicle according to an exemplary embodiment of the present disclosure.
Figure 3:
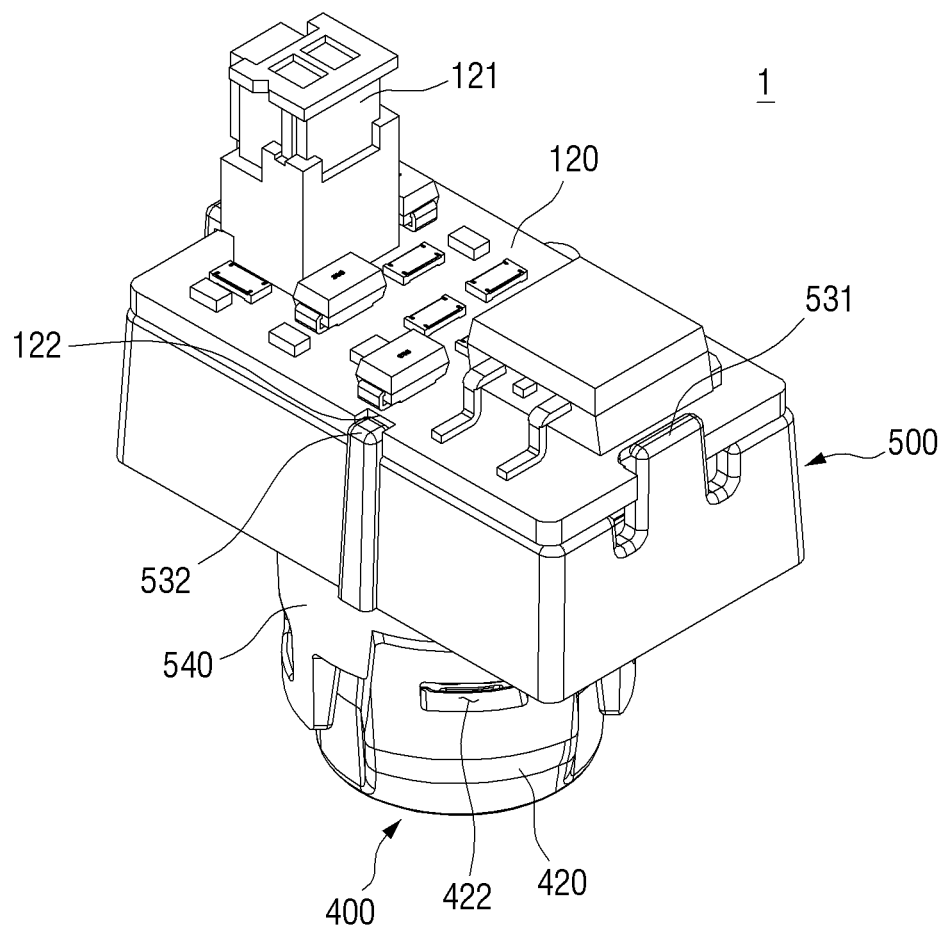
FIG. 3 is a perspective view showing a puddle lamp for a vehicle according to an exemplary embodiment of the present disclosure.
Figure 4:
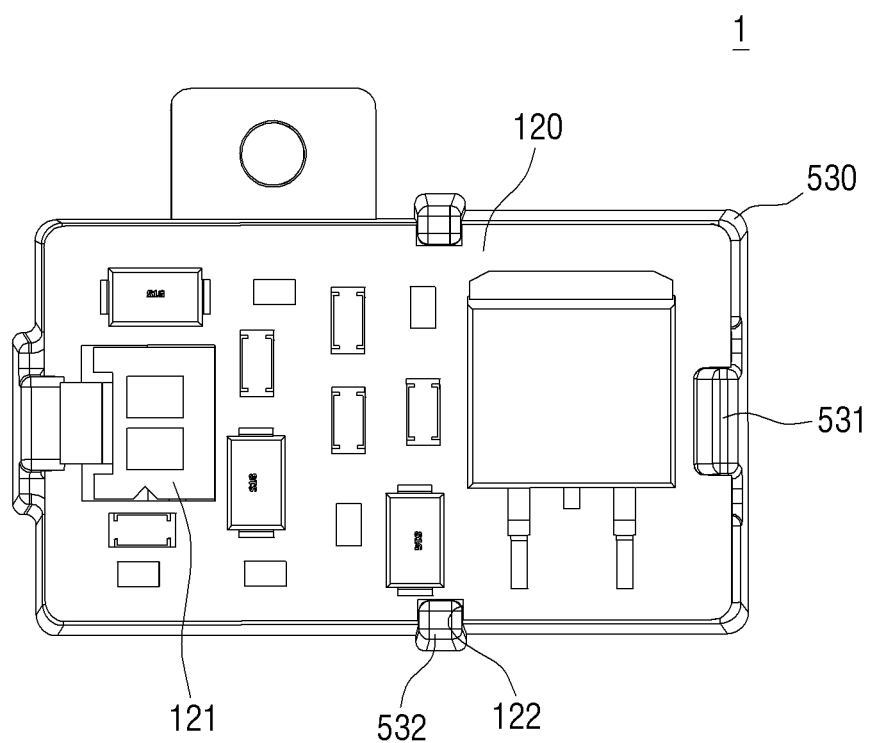
FIG. 4 is a plan view showing a puddle lamp for a vehicle according to an exemplary embodiment of the present disclosure.
Figure 5:
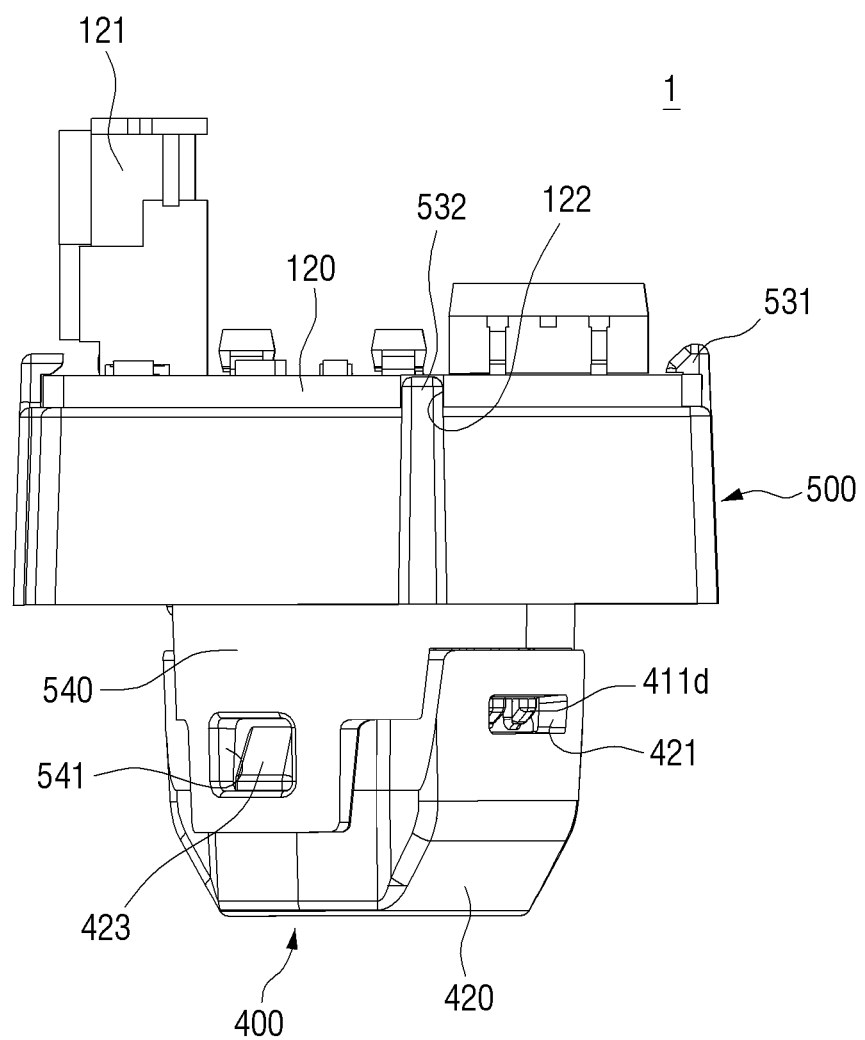
FIG. 5 is a side view showing a puddle lamp for a vehicle according to an exemplary embodiment of the present disclosure.
Figure 6:
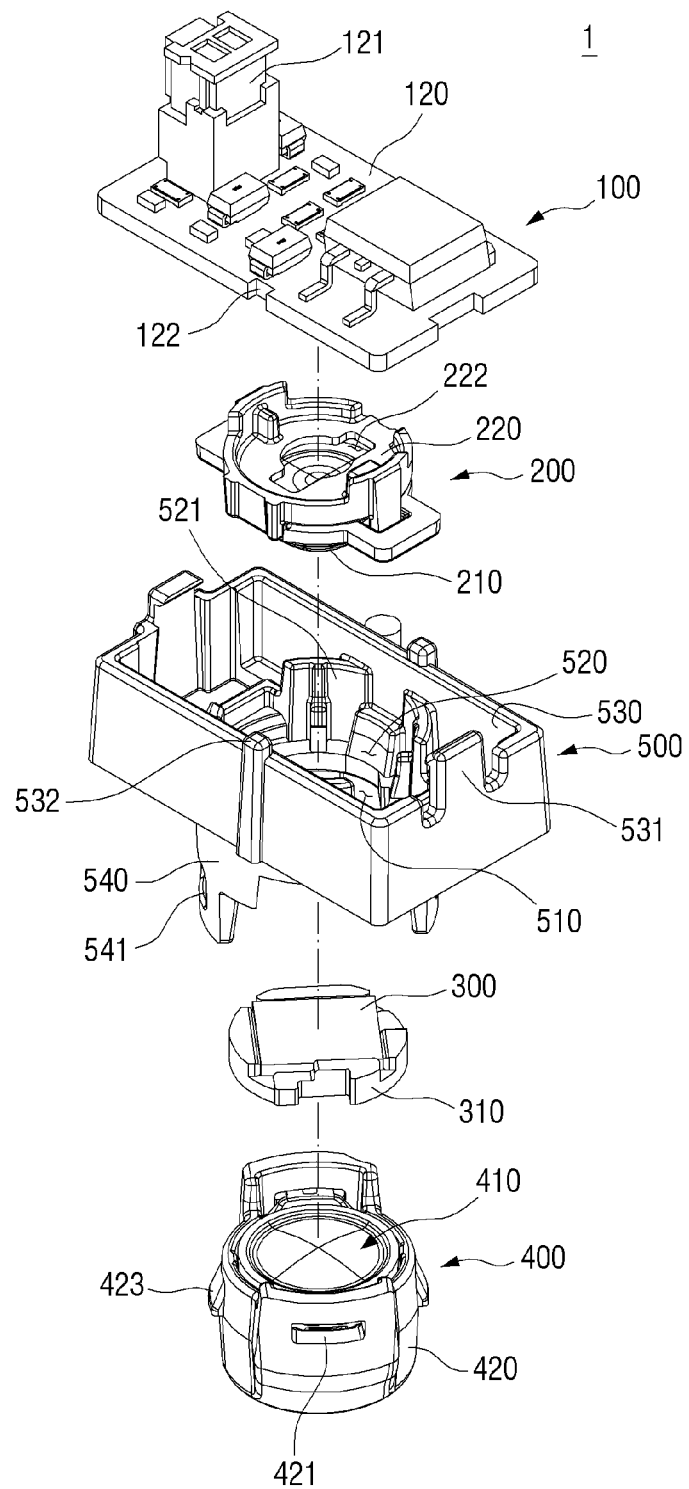
FIGS. 6 to 8 are exploded perspective views showing a puddle lamp for a vehicle according to an exemplary embodiment of the present disclosure.
Figure 7:
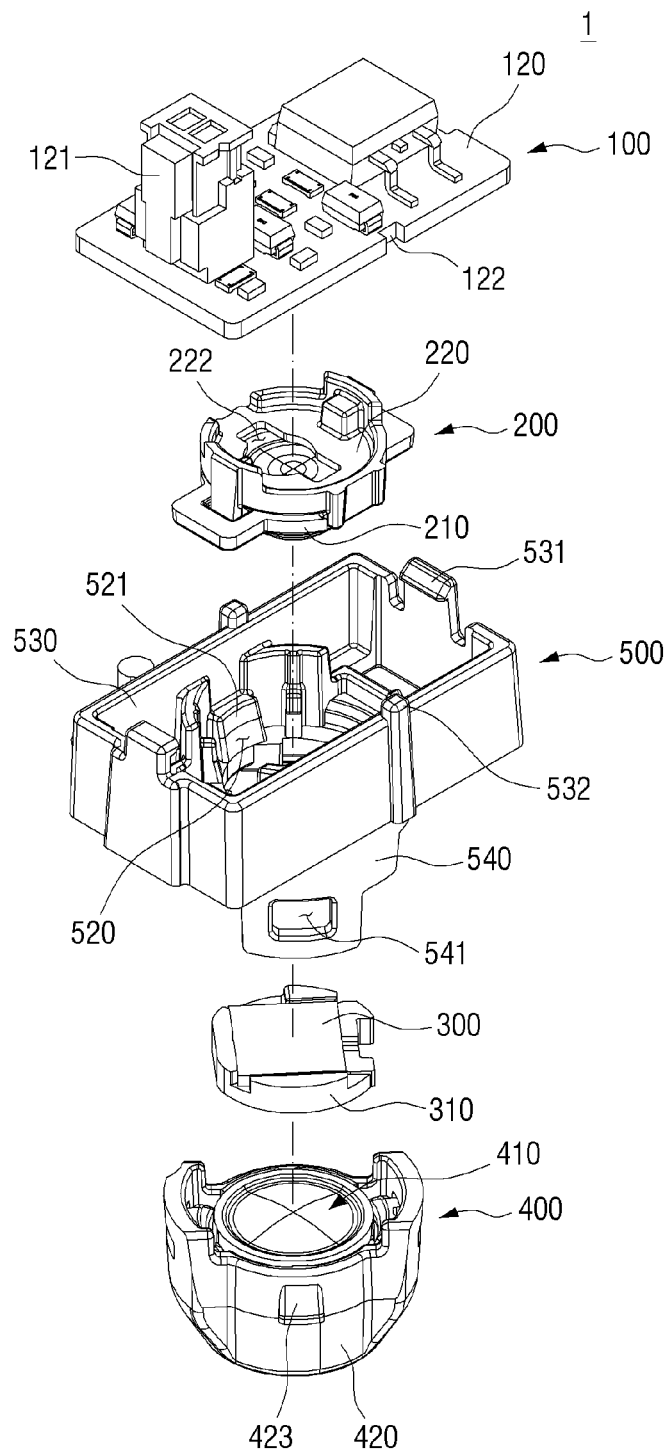
Figure 8:
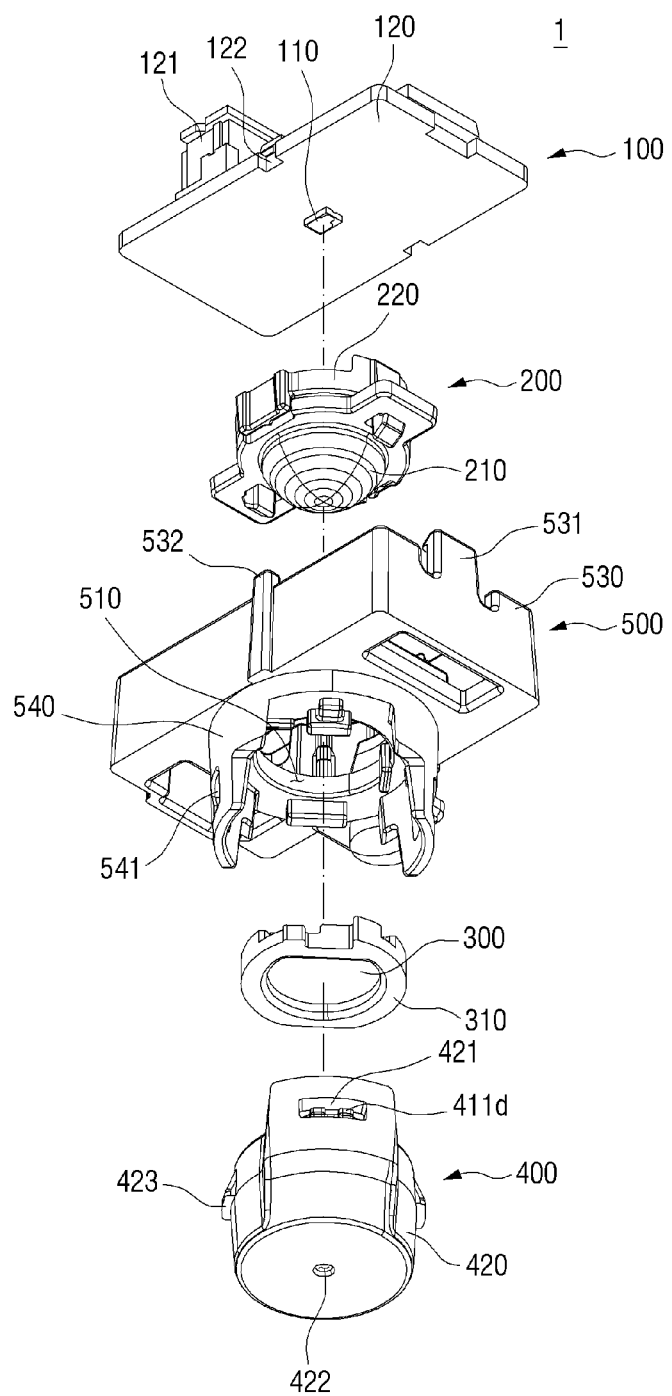

FIG. 2 is a perspective view showing a puddle lamp for a vehicle according to an exemplary embodiment of the present disclosure. FIG. 3 is a perspective view of a puddle lamp for a vehicle according to an exemplary embodiment of the present disclosure. FIG. 4 is a plan view showing a puddle lamp for a vehicle according to an exemplary embodiment of the present disclosure. FIG. 5 is a side view showing a puddle lamp for a vehicle according to an exemplary embodiment of the present disclosure. FIGS. 6 to 8 are exploded perspective view showing a puddle lamp for a vehicle according to an exemplary embodiment of the present disclosure. FIGS. 3 to 8 are examples when a housing 2 and an outer lens 3 of FIG. 2 are removed for description purposes.

Referring to FIGS. 2 to 8, a puddle lamp 1 for a vehicle according to an exemplary embodiment of the present disclosure may include a light source unit 100, a collimating unit 200, a logo mask 300, an image forming unit 400, and a holder 500. These components (100, 200, 300, 400, and 500) may be disposed within an inner receiving space formed by the housing 2, a side of which is opened, and the outer lens 3 is coupled to an open side of the housing 2.

The light source unit 100 may generate light having a quantity (e.g., intensity) or color of light required by the puddle lamp 1 of the vehicle according to the present disclosure. The light source unit 100 may include a light source 110 and a substrate 120 on which the light source 110 is installed. The substrate 120 may include various components such as a connector 121 for supplying power to the light source 110 or controlling the operation of the light source 110 as well as the light source 110. The housing 2 may include a connection aperture 2a through which a cable (not shown) connected to the connector 121 passes, and the connector 121 may be connected to the cable through the connection aperture 2a. The collimating unit 200 may collimate (e.g., concentrate) the light generated from the light source unit 100.

Figure 9:
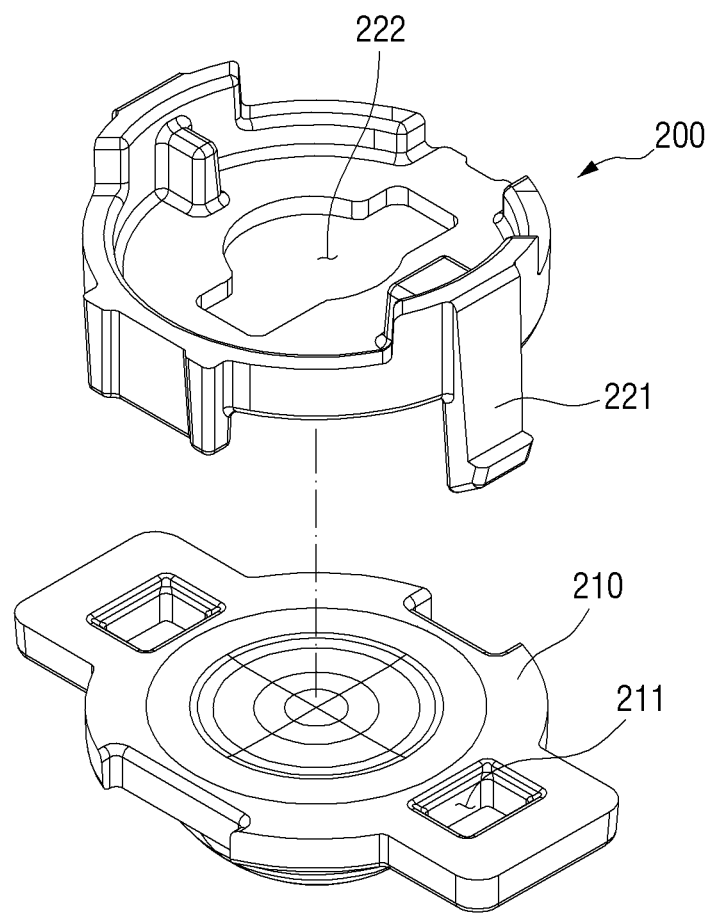
FIG. 9 is an exploded perspective view showing a collimating unit according to an exemplary embodiment of the present disclosure.

FIG. 9 is an exploded perspective view showing the collimating unit 200 according to an exemplary embodiment of the present disclosure. Referring to FIG. 9, the collimating unit 200 according to the exemplary embodiment of the present disclosure may include a collimating lens 210 and a spacer 220 to allow the collimating lens 210 to be spaced apart from the light source unit 100 at a predetermined interval. Although the exemplary embodiment of the present disclosure describes an example in which the collimating unit 200 includes a single collimating lens 210, the present disclosure is not limited thereto, and the collimating unit 200 may include a plurality of collimating lenses. A detailed description of an example where the collimating unit 200 includes the plurality of collimating lenses will be described later.

The collimating lens 210 and the spacer 220 may be coupled to prevent them from being separated from each other before, during, and/or after the collimating unit 200 is assembled to the holder 500. Accordingly, a coupling groove 211 may be formed in one of the collimating lens 210 and the spacer 220, and a coupling protrusion 221 inserted into the coupling groove 211 may be formed in the other of the collimating lens 210 and the space 220. The exemplary embodiment of the present disclosure will describe an example where the coupling groove 211 is formed in the collimating lens 210 and the coupling protrusion 221 is formed in the spacer 220. However, the coupling groove 211 may also be formed in the spacer 220, and the coupling protrusion 221 may also be formed in the collimating lens 210.

A position at which the collimating unit 200 is assembled to the holder 500 is relatively narrow, and the assembly time increases when assembling the collimating lens 210 and the spacer 220 in such a narrow space. Therefore, the collimating lens 210 and the spacer 220 may be coupled to be prevented from being separated from each other before the collimating unit 200 is assembled to the holder 500. Accordingly, by coupling the collimating lens 210 and the spacer 220 not to be separated from each other before the collimating unit 200 is assembled to the holder 500, the collimating unit 200 may be assembled to the holder 500 as a module, and the modular assembly may allow easier assembly.

A through-hole 222 may be formed in the spacer 220 to allow the light generated from the light source unit 100 to be incident on the collimating lens 210. A shape or size of the through-hole 222 may be variously modified based on a size or position of the light source 110.

Figure 10:
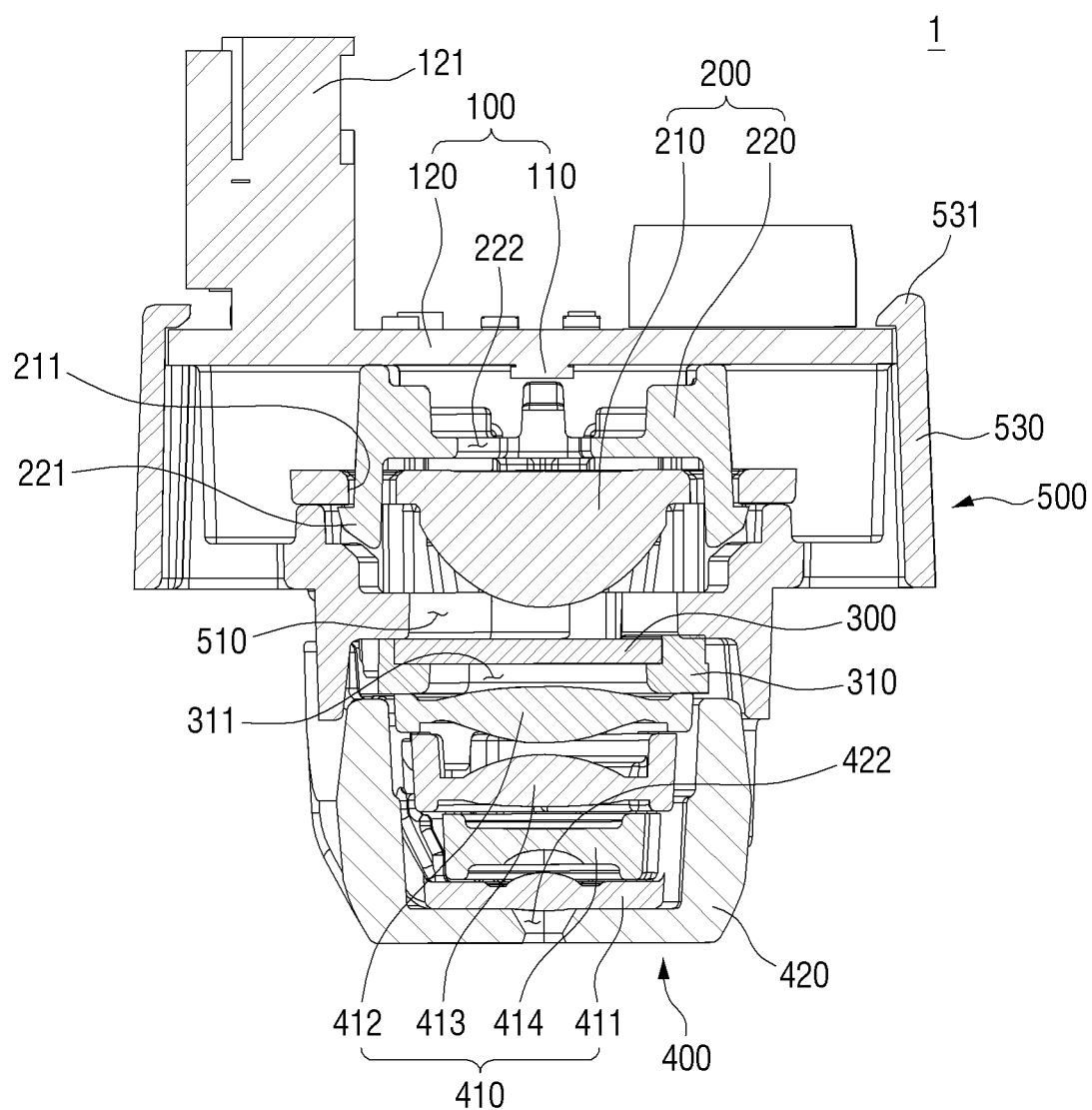
FIG. 10 is a cross-sectional view showing a collimating unit according to an exemplary embodiment of the present disclosure.

When the collimating unit 200 is assembled to the holder 500 and the light source unit 100 is positioned thereon as shown in FIG. 10, the spacer 220 may prevent structural interference between the collimating lens 210 and the light source unit 100 while preventing damage or abrasion due to a collision with each other by disposing the collimating lens 210 spaced apart from the light source unit 100, i.e., the light source 110 by a predetermined interval.

In the exemplary embodiment of the present disclosure, the light source unit 100 may be disposed above the collimating unit 200. Due to this configuration, light may be irradiated to the ground around the vehicle by the puddle lamp 1 of the vehicle of the present disclosure. However, the present disclosure is not limited thereto, and the collimating unit 200 may be disposed in front of the light source unit 100 based on a direction in which light is generated from the light source unit 100. In addition, the exemplary embodiment of the present disclosure will describe an example where the collimating lens 210 and the spacer 220 are coupled by the coupling groove 211 and the coupling protrusion 221. However, the present disclosure is not limited thereto, and the collimating lens 210 and the spacer 220 may be coupled in various ways such as hook coupling, screw coupling, adhesive, and the like.

The logo mask 300 may include an area for transmitting light emitted from the collimating unit 100 and an area for obstructing the light emitted from the collimating unit 100 from transmitting, in which a predetermined pattern may be formed by an area through which light is transmitted and an area through which light is obstructed. In an example of the logo mask 300 of the exemplary embodiment of the present disclosure, a pattern formed by the area through which light is transmitted and the area through which light is obstructed may correspond to a logo that represent a manufacturer or a brand of the vehicle. However, the present disclosure is not limited thereto, and the pattern of the logo mask 300 may include a variety of shapes or patterns that may represent unique characteristics of the vehicle. For example, the logo mask 300 may obstruct light from transmitting in an area corresponding to the pattern and transmit light in the remaining areas. Accordingly, an image corresponding to the pattern of the logo mask 300 may be formed on the ground around the vehicle based on the difference in contrast between the areas where the light that passes through the logo mask 300 is irradiated.

Figure 11:
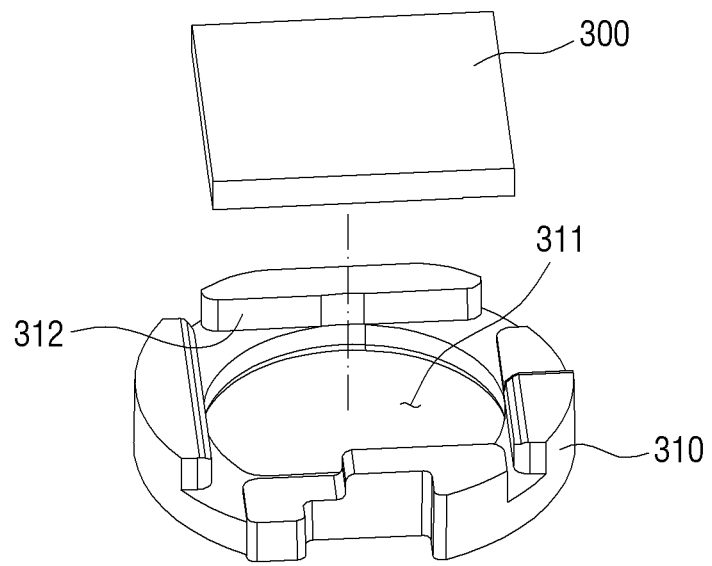
FIG. 11 is an exploded perspective view showing a logo mask and an O-ring that fixes the logo mask according to an exemplary embodiment of the present disclosure.

The logo mask 300 may be fixed by an O-ring 310 that is formed in a substantially annular shape and includes a central aperture 311, as shown in FIG. 11. In the exemplary embodiment of the present disclosure, the O-ring 310 may be made of a material having elastic properties such as rubber, silicone, or synthetic resin. Therefore, when the O-ring 310 is inserted into a specific space, the surrounding may be compressed and sealed, to remove a gap between the specific space and the O-ring 310.

The O-ring 310 may include an insertion groove 312 corresponding to a size and shape of the logo mask 300. When the logo mask 300 is inserted into and positioned in the insertion groove 312 of the O-ring 310, the logo mask 300 may be fixed to the O-ring 310 by the elasticity of the O-ring 310. When the logo mask 300 is fixed to the O-ring 310 as described above, the logo mask 300 may be easily installed and separated as compared with a configuration where the logo mask 300 is directly installed in the holder 500.

The image forming unit 400 may form an image corresponding to the pattern of the logo mask 300 on the ground around the vehicle by the light that passes through the logo mask 300. In the exemplary embodiment of the present disclosure, the image forming unit 400 may ensure that an image formed to correspond to the pattern of the logo mask 300 on the ground around the vehicle has an appropriate size and sharpness by, for example, projecting, focusing, and/or optically adjusting the image.

Figure 12:
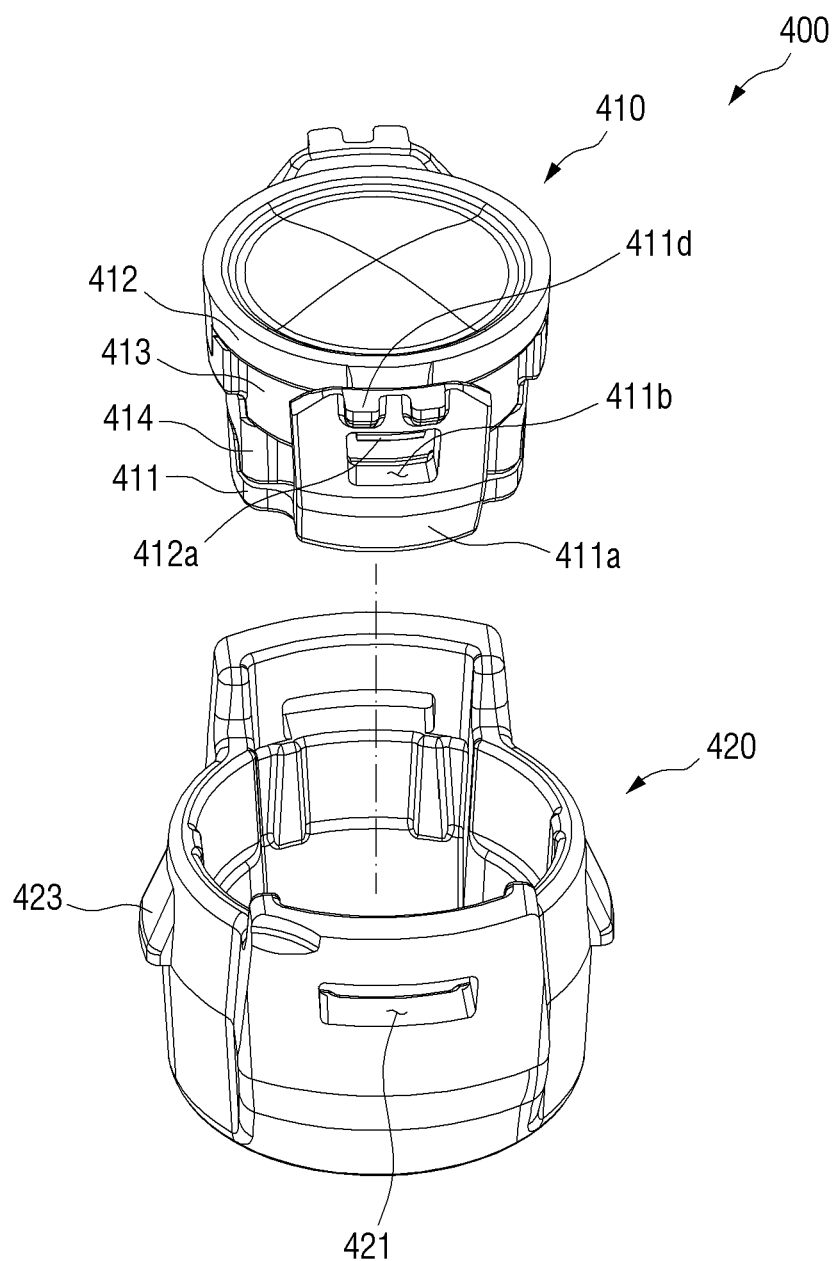
FIGS. 12 and 13 are exploded perspective views showing an image forming unit according to an exemplary embodiment of the present disclosure.
Figure 13:
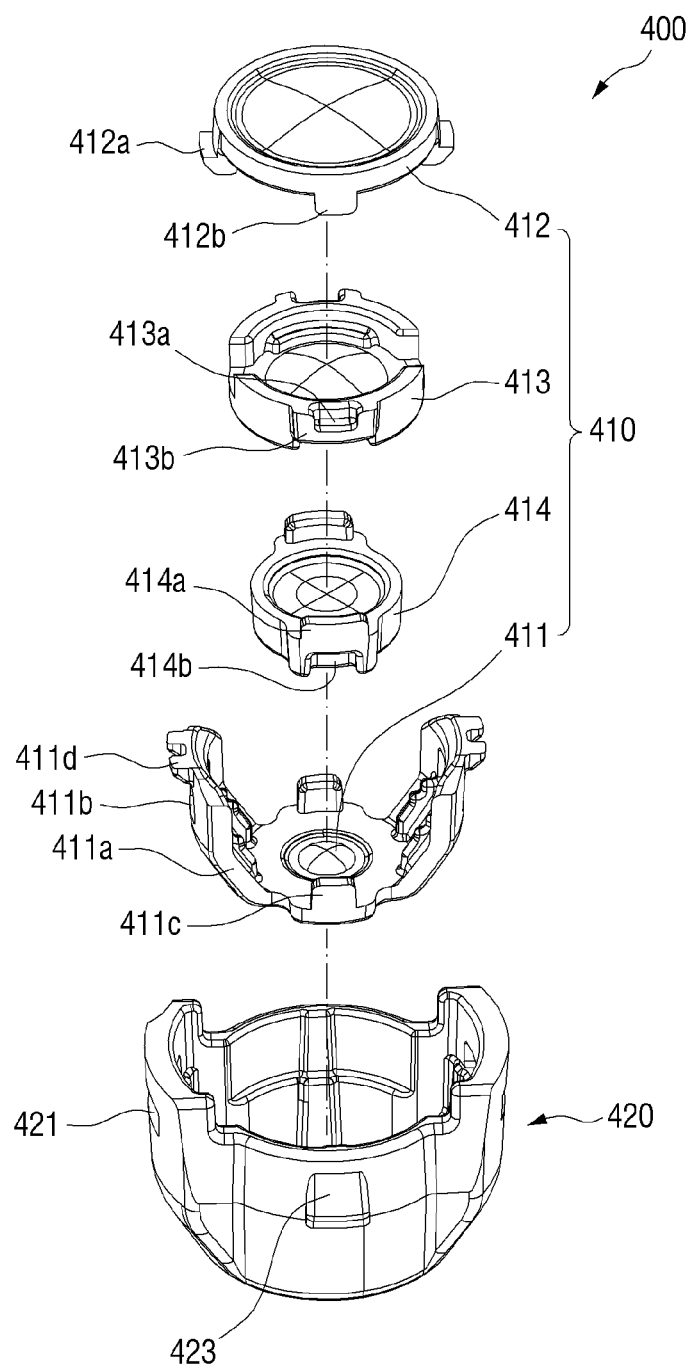

FIGS. 12 and 13 are exploded perspective views showing an image forming unit according to an exemplary embodiment of the present disclosure. Referring to FIGS. 12 and 13, the image forming unit 400 according to the exemplary embodiment of the present disclosure may include a lens assembly 410 and a barrel 420. The lens assembly 410 may be assembled by stacking a plurality of lenses 411, 412, 413, and 414. Hereinafter, in the exemplary embodiment of the present disclosure, the plurality of lenses 411, 412, 413, and 414 are referred to as a first lens 411, a second lens 412, a third lens 413, and a fourth lens 414, respectively. Each of the plurality of lenses 411, 412, 413, and 414 may have various lens characteristics based on the size or sharpness of an image formed on the ground around the vehicle by the image forming unit 400.

In an exemplary embodiment of the present application, an image may be formed on the ground around the vehicle by the image forming unit 400. Therefore, the plurality of lenses 411, 412, 413, 414 may be stacked and assembled along a vertical direction, and the first lens 411 may be disposed at a bottom that is farthest from the logo mask 300, and the second lens 412 may be disposed at a top that is closest to the logo mask 300. However, the present disclosure is not limited thereto, and a direction in which the plurality of lenses 411, 412, 413, and 414 are stacked may vary depending to a direction in which the light passes through the image forming unit 400.

The first lens 411 may be a lens disposed at the bottom of the plurality of lenses 411, 412, 413, and 414, and the light emitted from the image forming unit 400 may be emitted from the first lens 411. The second lens 412 may be a lens disposed at the top of the plurality of lenses 411, 412, 413, and 414, and the light that passes through the logo mask 300 may be incident on the second lens 412. The second lens 412 may be coupled to the first lens 411 by being fastened to at least one fastening portion 411a formed to extend from the first lens 411 toward the second lens 412. The at least one fastening portion 411a may extend from an edge of the first lens 411 toward the second lens 412, and an end of the at least one fastening portion 411a may be disposed adjacent to an edge of the second lens 412 when the first lens 411 and the second lens 412 are coupled to each other.

For example, a fastening groove 411b may be formed at an end of the at least one fastening portion 411a, and a fastening protrusion 412a may be formed in the second lens 412 to be inserted into the fastening groove 411b to couple the first lens 411 and the second lens 412 to each other. In an exemplary embodiment of the present disclosure, the fastening groove 411b may be formed in the at least one fastening portion 411a, and the fastening protrusion 412a may be formed in the second lens 412. However, the present disclosure is not limited thereto, and the fastening groove 411b may also be formed in the second lens 412, and the fastening protrusion 412a may also be formed in the at least one fastening portion 411a.

The third lens 413 and the fourth lens 414 may be disposed between the first lens 412 and the second lens 414. In an exemplary embodiment of the present disclosure, two lenses may be disposed between the first lens 411 and the second lens 412. However, the present disclosure is not limited thereto. The number of lenses disposed between the first lens 411 and the second lens 412 may be varies based on the size or sharpness of the image formed on the ground around the vehicle. Further, in some embodiments, a lens may be omitted between the first lens 411 and the second lens 412.

In the plurality of lenses 411, 412, 413, and 414, the lenses 413 and 414 disposed between the first lens 411 and the second lens 412 may be fixed in position as the first lens 411 disposed at the bottom and the second lens 412 disposed at the top are coupled to each other in the stacking order. As a result, the plurality of lenses 411, 412, 413, and 414 may be coupled to each other and may be prevented from being separated from each other before, during, and/or after the image forming unit 400 is assembled to the holder 500.

The plurality of lenses 411, 412, 413, and 414 described above may include alignment ribs 411c, 412a, and 414a in one of adjacent lenses, and alignment grooves 413a, 413b, and 414b may be formed in the other of adjacent lenses. In an exemplary embodiment of the present disclosure, alignment protrusions 411c and 412b may be formed in the first lens 411 and the second lens 412, respectively, and the third lens 413 may include an alignment groove 413a into which the alignment protrusion 412b of the second lens 412 is inserted and an alignment groove 413b into which the alignment rib 414a of the fourth lens 414 is inserted. Further, the fourth lens 414 may include the alignment rib 414a as well as an alignment groove 414b into which the alignment rib 411c of the first lens 411 are inserted. However, the present disclosure is not limited thereto, and each lens 411, 412, 413, and 414 may include at least one of an alignment protrusion and an alignment groove depending on the stacking order.

In particular, the alignment rib 411c of the first lens 411 may have a width that corresponds to a width of the alignment groove 414b of the fourth lens 414, the alignment rib 414a of the fourth lens 414 may have a width that corresponds to a width of the alignment groove 413b of the third lens 413, and the alignment rib 412b of the second lens 412 may have a width that corresponds to a width of the alignment groove 413a of the third lens 413. Further, the alignment rib 411c of the first lens 411, the alignment rib 414a of the fourth lens 414, and the alignment protrusion 412b of the second lens 412 may be formed to have different widths to preclude an incorrect assembly during the process of stacking and coupling the plurality of lenses 411, 412, 413, and 414. In other words, when the plurality of lenses 411, 412, 413, and 414 are not stacked in the correct stacking order, the alignment rib may be unable to be inserted into the alignment groove, and no stacking may be performed, or the width of the alignment ribs may be narrower than the width of the alignment groove to allow movements between the adjacent lenses. Thus, the incorrect assembly may be prevented.

The lens assembly 410 described above may be received in the barrel 420. The lens assembly 410 may be coupled such that the at least one fastening portion 411a and the barrel 420 are coupled to each other so as not to be separated from the barrel 420. In an exemplary embodiment of the present disclosure, an insertion protrusion 411d may be formed in the at least one fastening portion 411a, and an insertion groove 421 into which the insertion protrusion 411d is inserted may be formed in the barrel 420 to couple them to each other. However, the present disclosure is not limited thereto, and the insertion protrusion 411d may also be formed in the barrel 420, and the insertion groove 421 into which the insertion protrusion 411d is inserted may also be formed in the at least one fastening portion 411a.

The barrel 420 may receive the lens assembly 410 and may prevent the light that passes through the lens assembly 410 from leaking out. A transmission aperture 422 may be formed at a bottom of the barrel 420 to allow the light that passes through the lens assembly 410 to be irradiated to the ground around the vehicle. Accordingly, the light emitted from the first lens 411 of the lens assembly 410 may be irradiated to the ground around the vehicle or the vehicle body through the transmission aperture 422 to improve visibility in the low-light conditions, and at the same time, an image corresponding to the pattern of the logo mask 300 may be formed.

Figure 14:
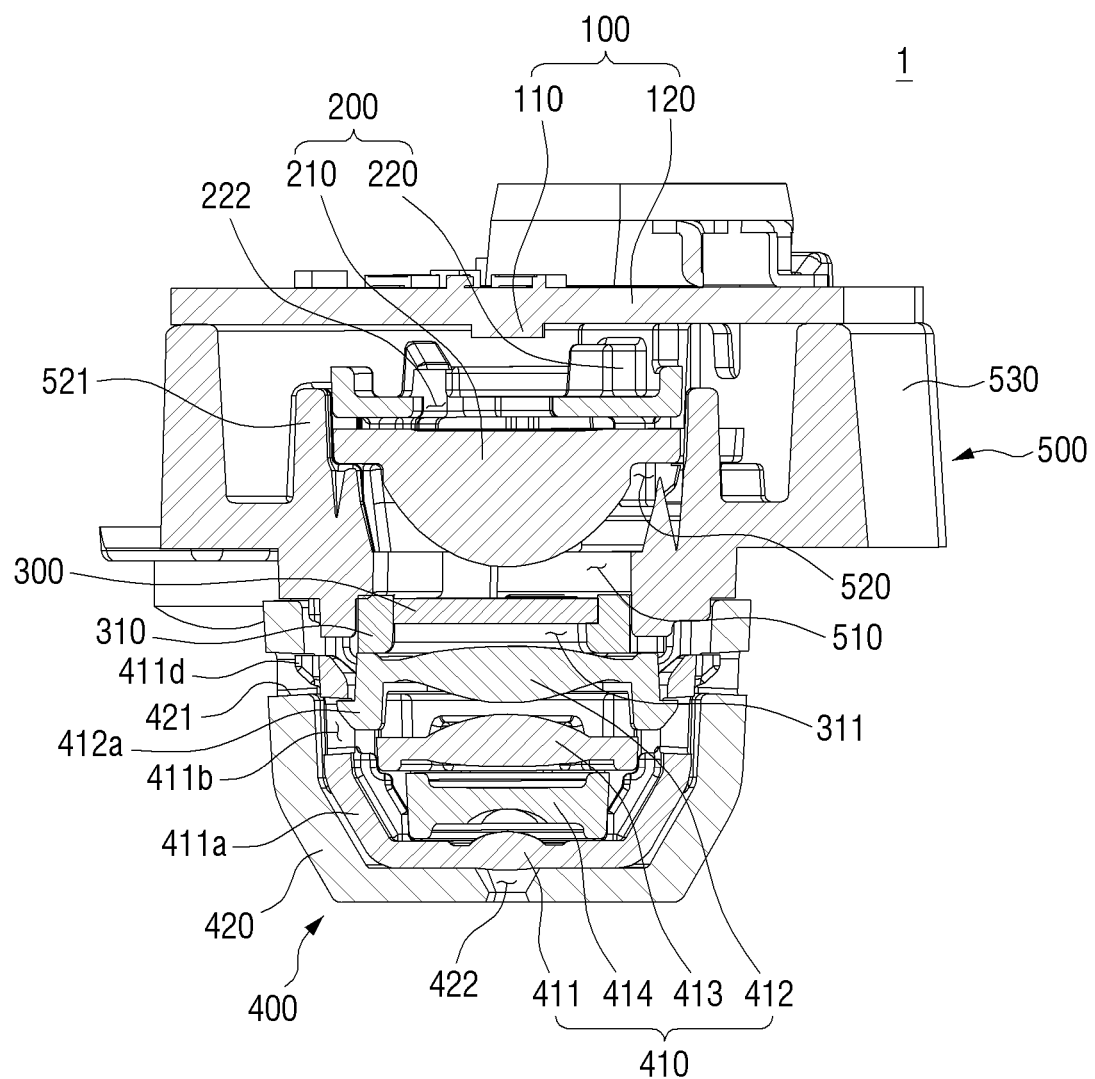
FIG. 14 is a cross-sectional view showing an image forming unit according to an exemplary embodiment of the present disclosure.

As described above, the lens assembly 410 and the barrel 420 may be coupled to prevent them from being separated from each other before the image forming unit 400 is assembled to the holder 500, thereby allowing easier assembly. In other words, in the image forming unit 400 as shown in FIG. 14, the plurality of lenses 411, 412, 413, and 414 constituting the lens assembly 410 may be fixed by the first lens 411 and the second lens 412 coupled to each other, and the lens assembly 410 may be subsequently coupled to the barrel 420 to allow the image forming unit 400 to be assembled to the holder 500 as a module. Accordingly, the assembly process may be simplified as compared to individually assembling each of the components constituting the image forming unit 400, thereby reducing the assembly time.

The holder 500 may serve to assemble and fix the light source unit 100, the collimating unit 200, the logo mask 300, and the image forming unit 400. The assembly of the puddle lamp 1 of the vehicle according to the present disclosure may be completed by positioning the holder 500 in which the light source unit 100, the collimating unit 200, the logo mask 300, and the image forming unit 400 are assembled into the housing 2 through an open surface of the housing 2, and by coupling the outer lens 3 to the open surface of the housing 2 by heat fusion or the like. The holder 500 may be formed with a hollow 510, in which in a direction of formation of the hollow 510, the light source unit 100 and the collimating unit 200 may be disposed at one side, and the logo mask 300 and the image forming unit 400 may be disposed at the other side.

In the puddle lamp 1 of the vehicle according to the present disclosure, the light may be irradiated downward to form an image on the ground around the vehicle. Therefore, the light source unit 100, the collimating unit 200, the logo mask 300, and the image forming unit 400 may be disposed in order from top to bottom. In an exemplary embodiment of the present disclosure, the light source unit 100 and the collimating unit 200 may be assembled on an upper portion of the holder 500, and the logo mask 300 and the image forming unit 400 may be assembled on a lower portion of the holder 500.

The holder 500 may include, above the hollow 510, a receiving portion 520 in which the collimating unit 200 is received. The light source unit 100 may be disposed above the collimating unit 200. The receiving portion 520 may include a partition wall 521 formed to protrude upward from at least a portion of the periphery of the hollow 510.

In the exemplary embodiment of the present disclosure, the collimating lens 210 and the spacer 220 may be coupled so as not to be separated from each other before the collimating unit 200 is assembled to the holder 500. Therefore, the assembly may become easier compared to where the collimating lens 210 is disposed in the receiving portion 520 and then the spacer 220 is separately disposed. In other words, when assembling the collimating lens 210 and the spacer 220 individually, the collimating lens 210 is disposed in the receiving portion 520, and then the spacer 220 is disposed thereon. In this case, it is difficult to assemble the collimating lens 210 and the spacer 220 in a narrow space of the receiving portion 520. However, in the exemplary embodiment of the present disclosure, the collimating unit 200 may be disposed in the receiving portion 520 as a module, and the assembly may become easier.

Figure 15:
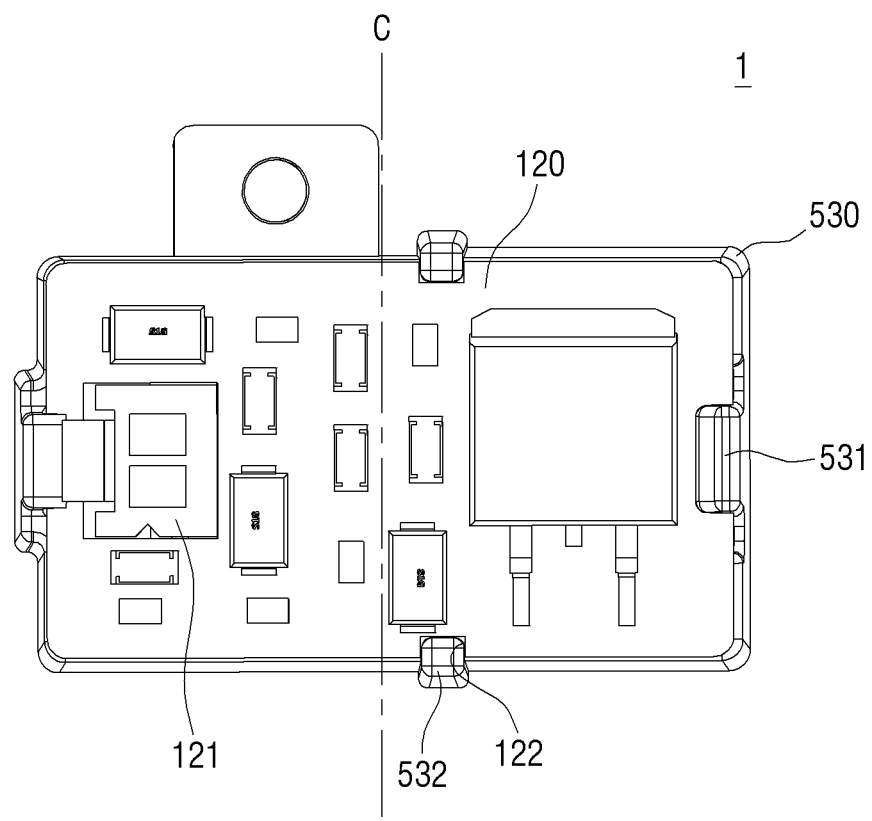
FIG. 15 is a plan view showing a guide rib and a guide groove for aligning the assembly position of a light source unit according to an exemplary embodiment of the present disclosure.

The holder 500 may include an outer wall 530 formed around the receiving portion 520, in which the outer wall 530 may support the light source unit 100 and fix the position. The outer wall 530 may be formed with engaging projections 531 at both ends that face each other in a first direction, in which the engaging projections 531 are disposed to allow the outer wall 530 to be engaged at both ends of the substrate 120. Further, the outer wall 530 may include guide ribs 532 at both ends that face each other in a second direction, in which the guide ribs 532 are inserted into the guide groove 122 formed in the substrate 120 to align the assembly position of the light source unit 100. As shown in FIG. 15, the guide ribs 532 and the guide grooves 122 may be formed at one side with respect to the centerline C that connects centers of opposite side ends of the substrate 120. Therefore, misassembly of the light source unit 100 may be prevented.

The O-ring 310 having the logo mask 300 inserted therein may be seated around the hollow 510 from the lower portion of the holder 510. The movement of the O-ring 310 may be prevented by at least one extension 540 that extends downward from the periphery of the hollow 510. The at least one extension 540 may be coupled with the image forming unit 400 to fix the O-ring 310 and the image forming unit 400.

The image forming unit 400 may be coupled to the holder 500 by inserting a fixing protrusion 423 formed on an outer surface of the barrel 420 into a fixing groove 541 formed in the at least one extension 540. When the image forming unit 400 is coupled to the holder 500, the O-ring 310 may receive pressure from both sides by the periphery of the hollow 510 of the holder 500 and the image forming unit 400, thereby fixing its position.

In an exemplary embodiment described above, the collimating unit 200 may include a single collimating lens 210. However, the collimating unit 200 may include a plurality of collimating lenses depending on the sharpness or brightness of an image to be formed to correspond to the pattern of the logo mask 300.

Figure 16:
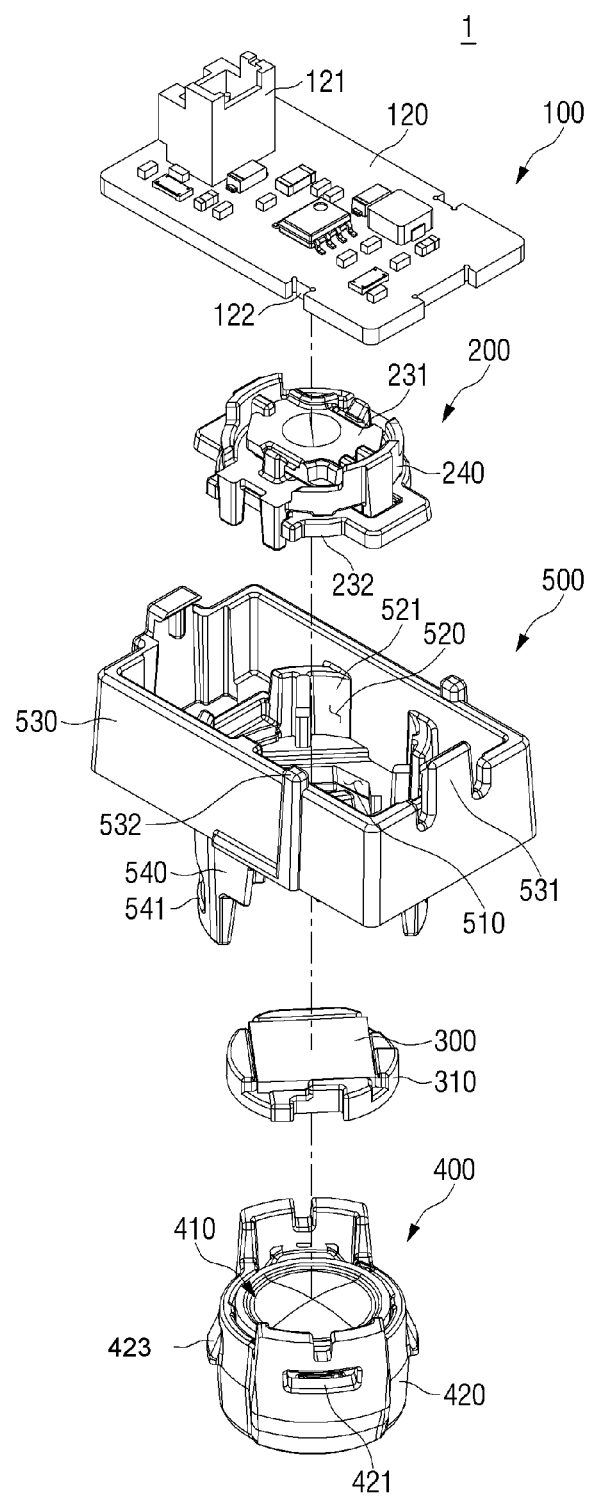
FIG. 16 is an exploded perspective view showing a puddle lamp for a vehicle according to another exemplary embodiment of the present disclosure.
Figure 17:
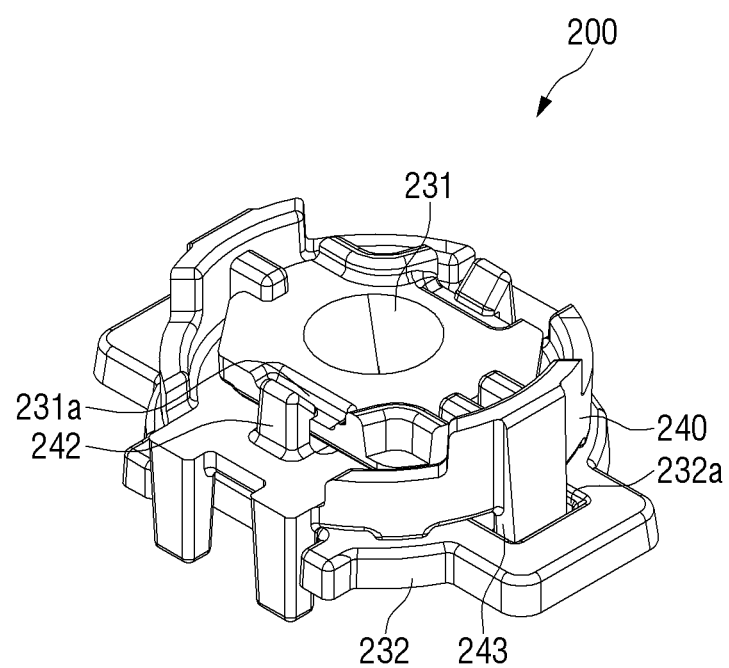
FIG. 17 is a perspective view showing a collimating unit according to another exemplary embodiment of the present disclosure.
Figure 18:
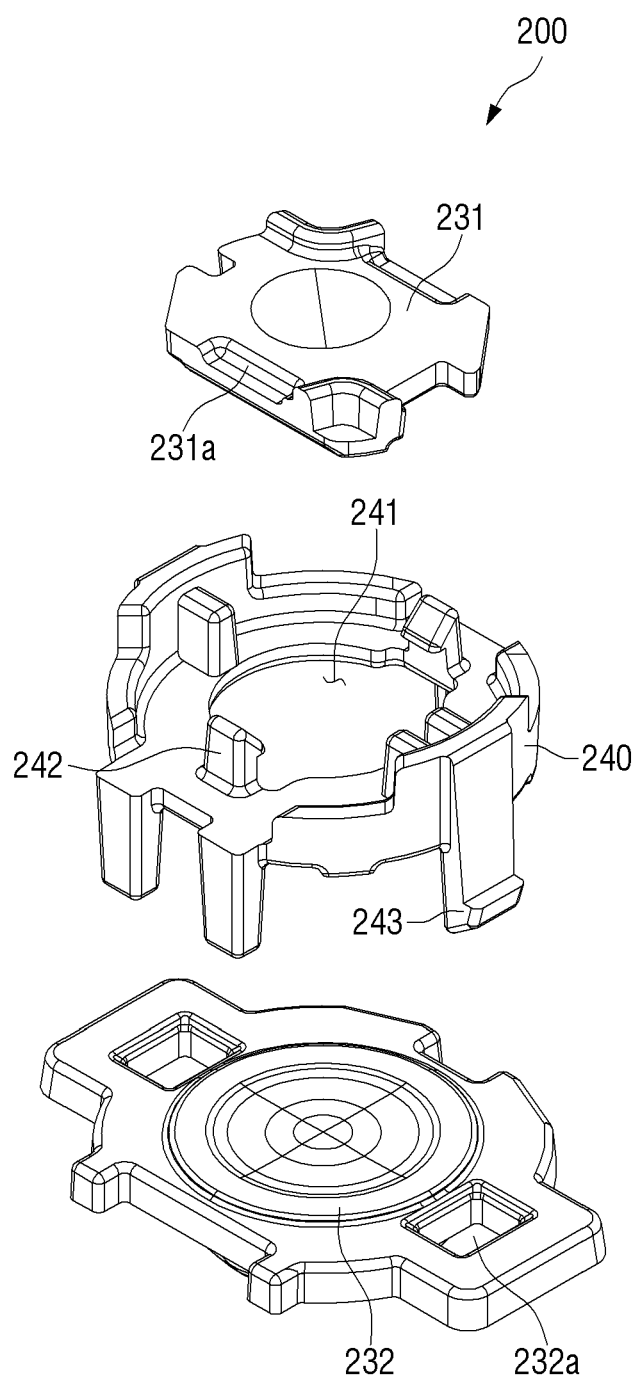
FIGS. 18 and 19 are exploded perspective views showing a collimating unit according to another exemplary embodiment of the present disclosure.
Figure 19:
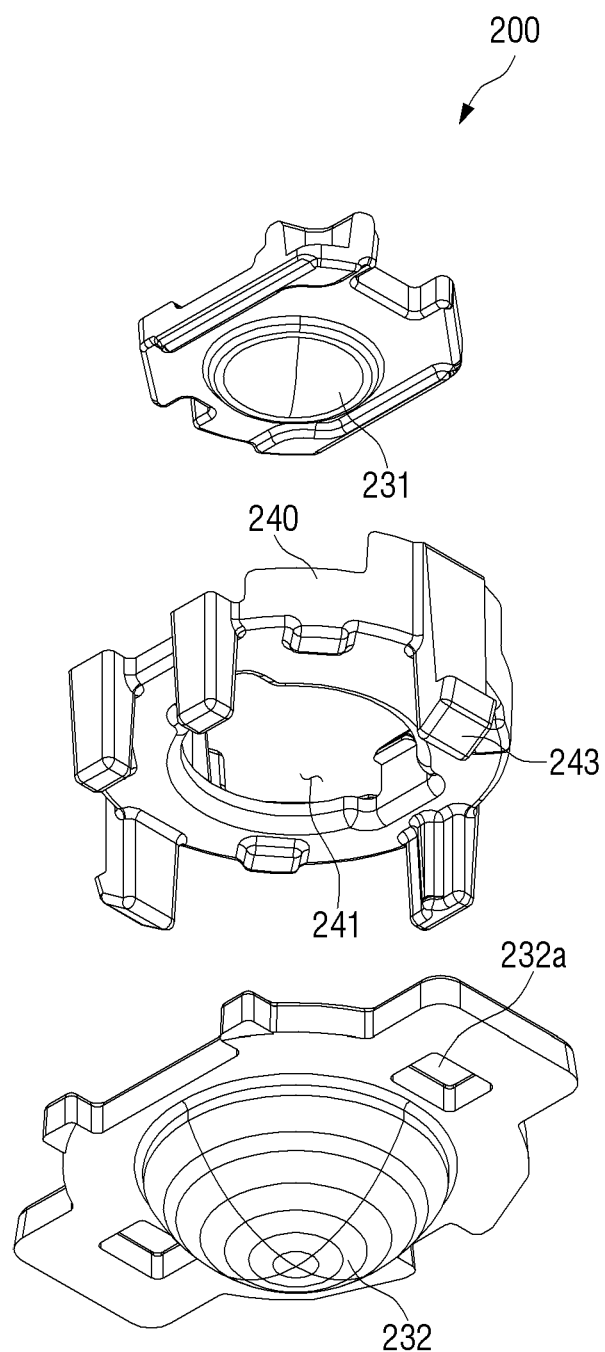
Figure 20:
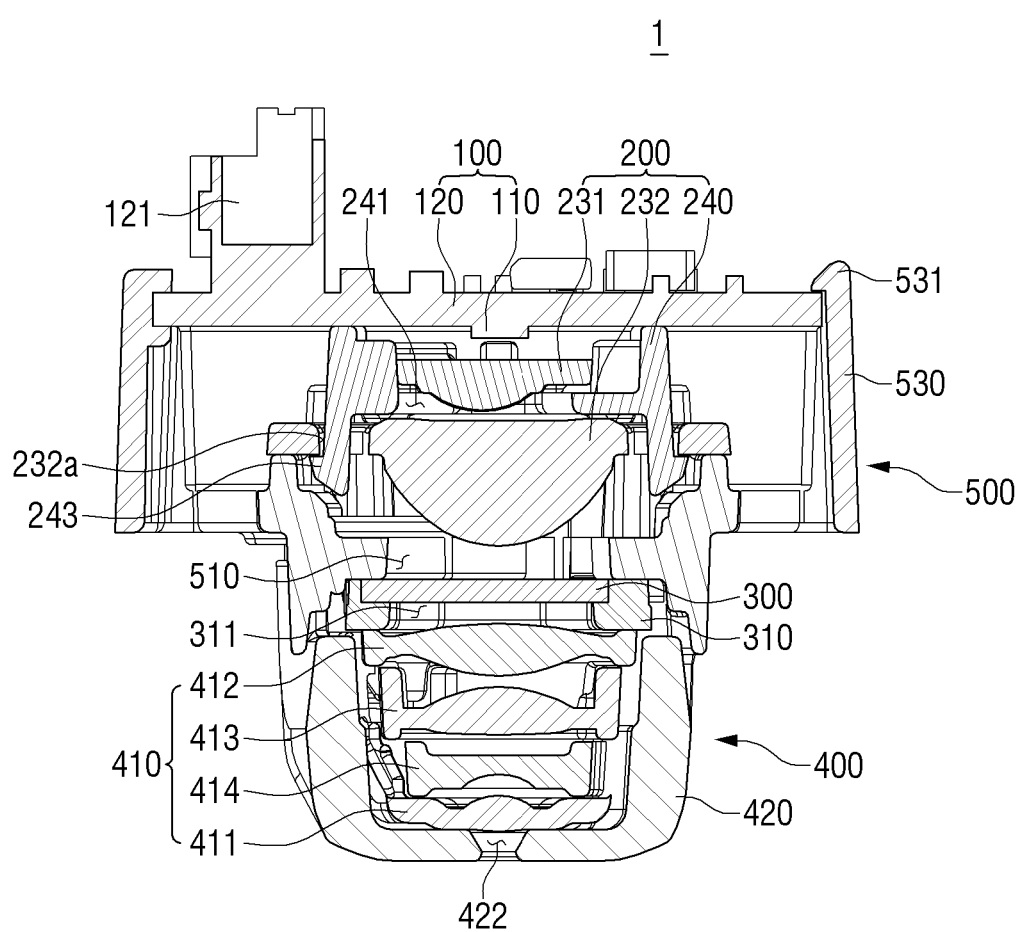
FIGS. 20 and 21 are cross-sectional views showing a puddle lamp for a vehicle according to another exemplary embodiment of the present disclosure.
Figure 21:
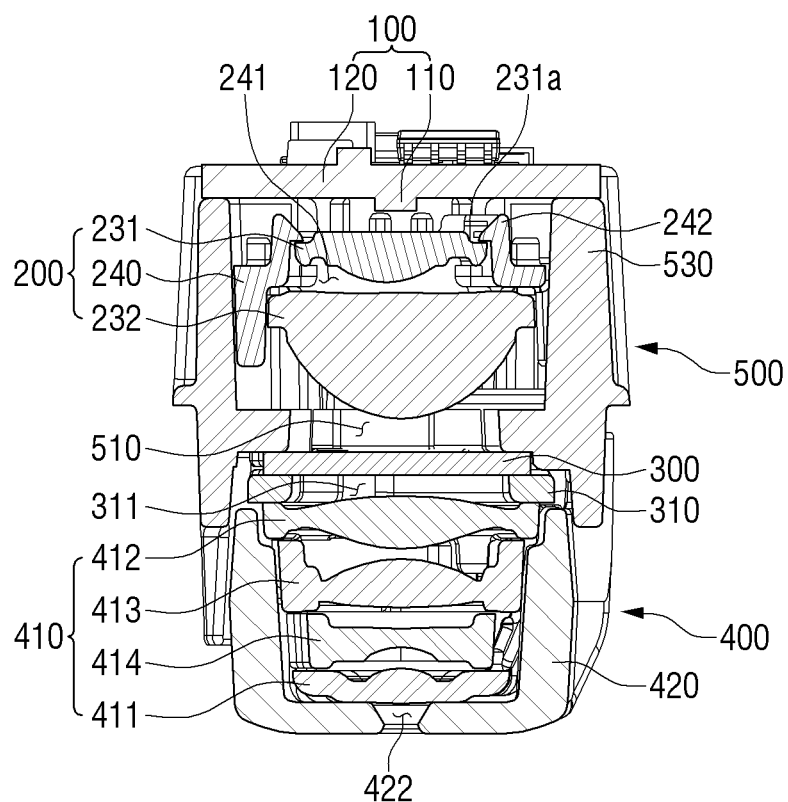

FIG. 16 is an exploded perspective view showing a puddle lamp for a vehicle according to another exemplary embodiment of the present disclosure. FIG. 17 is a perspective view showing a collimating unit according to another exemplary embodiment of the present disclosure. FIGS. 18 and 19 are exploded perspective views showing a collimating unit according to another exemplary embodiment of the present disclosure. FIGS. 20 and 21 are cross-sectional views showing a puddle lamp for a vehicle according to another exemplary embodiment of the present disclosure.

Referring to FIGS. 16 to 21, a lamp 1 for a vehicle according to another exemplary embodiment of the present disclosure may include a light source unit 100, a collimating unit 200, a logo mask 300, an image forming unit 400, and a holder 500 similar to the exemplary embodiment described above. In FIGS. 16 to 21, the same reference numerals will be used to refer to components having the same function as the above-described exemplary embodiment, and a detailed description thereof will be omitted.

Further, it is understood that, in FIGS. 16 to 21, there may be some differences in the position and shape of components having the same function as the above-described exemplary embodiment, and the position or shape of the components having the same function as the above-described exemplary embodiment may be modified.

In the another exemplary embodiment of the present disclosure, the collimating unit 200 may include a plurality of collimating lenses 231 and 232 and a spacer 240 for allowing the plurality of collimating lenses 231 and 232 to be spaced apart from the light source unit 100 at a predetermined interval. In particular, the plurality of collimating lenses 231 and 232 and the spacer 240 may be coupled and may be prevented from being separated from each other before the collimating unit 200 is assembled to the holder 500. Therefore, it may allow easier assembly as compared with assembling the plurality of collimating lenses 231 and 232 and the spacer 240 respectively in a narrow space of the receiving portion 520.

In another exemplary embodiment of the present disclosure, the plurality of collimating lenses 231 and 232 may include a first collimating lens 231 and a second collimating lens 232 arranged along a direction of the light generated from the light source unit 100, to allow the light that passes through the first collimating lens 231 to be transmitted to the second collimating lens 232 through a passage aperture 241 formed in the spacer 240.

Coupling grooves 231a and 232a may be formed in each of the first collimating lens 231 and the second collimating lens 232, and coupling protrusions 242 and 243 may be formed in the spacer 240 to be inserted into the coupling grooves 231a and 232a of the first and second collimating lenses 231 and 232, respectively. Therefore, the plurality of collimating lenses 231 and 232 and the spacer 240 may be coupled so as not to be separated from each other before the collimating unit 200 is assembled to the holder 500.

In another exemplary embodiment of the present disclosure, the coupling grooves 231a and 232a may be formed in the first collimating lens 231 and the second collimating lens 232, and the coupling protrusions 242 and 243 may be formed in the spacer 240. However, the present disclosure is not limited thereto, and the vice versa is also possible.

In another exemplary embodiment of the present disclosure, the plurality of collimating lenses may include two collimating lenses. However, it is merely an example to help understand the present disclosure, and the present disclosure is not limited thereto. Two or more collimating lenses may be used depending on the sharpness or brightness required in the image to be formed by the puddle lamp 1 of the vehicle according to the present disclosure.

The light generated from the light source unit 100 may sequentially pass through the first collimating lens 231 and the second collimating lens 232, and may be transmitted to the logo mask 300. The light generated from the light source unit 100 may be primarily concentrated by the first collimating lens 231, and then the light may be further concentrated by the second collimating lens 232. Therefore, the light concentration may be improved. As a result, the brightness and sharpness of the image formed to correspond to the pattern of the logo mask 300 may be further increased.

As described above, the collimating lenses 210, 231, 232 and the spacers 220, 240 constituting the collimating unit 200 may be coupled to be prevented from being separated from each other before the puddle lamp 1 of the vehicle of the present disclosure is assembled to the holder 500, and the lens assembly 410 and the barrel 420 constituting the image forming unit 400 may be coupled to be prevented from being separated from each other so that the collimating unit 200 and the image forming unit 400 may be assembled to the holder 500 as a module. Therefore, the assembly process may be simplified, and the assembly time may be decreased. Further, since the collimating unit 200 and the image forming unit 400 are assembled to the holder 500 as a module, replacement and repair may be facilitated.

In concluding the detailed description, those skilled in the art will appreciate that many variations and modifications can be made to the preferred exemplary embodiments without substantially departing from the principles of the present disclosure. Therefore, the disclosed preferred exemplary embodiments of the disclosure are used in a generic and descriptive purpose only and not for purposes of limitation.

What is claimed is:

1. A puddle lamp for a vehicle comprising:
   a collimating unit for collimating light emitted from a light source unit;
   a logo mask having a predetermined pattern that includes a region through which the light is transmitted and a region through which the light is obstructed;
   an image forming unit for forming an image corresponding to the pattern by the light that passes through the logo mask from the collimating unit; and
   a holder in which the collimating unit and the image forming unit are assembled,
   wherein the image forming unit comprises a lens assembly in which a plurality of lenses are stacked and assembled, the lens assembly comprising:
   a first lens; and
   a second lens disposed on and coupled to the first lens via at least one fastening portion that extends from the first lens,
   wherein an alignment rib for aligning a position is formed in one of adjacent lenses among the plurality of lenses, and an alignment groove in which the alignment rib is inserted is formed in the other of the adjacent lenses, and
   wherein an alignment rib and an alignment groove of one of the plurality of lenses have different widths from an alignment rib and an alignment groove of another of the plurality of lenses.

2. The puddle lamp for the vehicle of claim 1, wherein the plurality of lenses are coupled to be prevented from being separated from each other.

3. The puddle lamp for the vehicle of claim 1, wherein the at least one fastening portion extends from an edge of the first lens toward the second lens, and
   wherein an end of the at least one fastening portion is disposed adjacent to an edge of the second lens when the first lens and the second lens are coupled to each other.

4. The puddle lamp for the vehicle of claim 1, wherein a fastening protrusion is formed on one of the second lens and the at least one fastening portion, and
   wherein a fastening groove into which the fastening protrusion is inserted is formed on the other of the second lens and the at least one fastening portion.

5. The puddle lamp for the vehicle of claim 1, wherein the first lens is a lens that is farthest from the logo mask among the plurality of lenses along a direction of the light that passes through the image forming unit,
   wherein the second lens is a lens that is closest to the logo mask among the plurality of lenses, and
   wherein at least one lens is disposed between the first lens and the second lens.

6. The puddle lamp for the vehicle of claim 5, wherein the at least one lens disposed between the first lens and the second lens has a fixed position when the first lens and the second lens are coupled to each other.

7. The puddle lamp for the vehicle of claim 1, further comprising:
   a barrel in which the lens assembly is received,
   wherein the lens assembly and the barrel are coupled to be prevented from being separated from each other.

8. The puddle lamp for the vehicle of claim 7, wherein an insertion protrusion is formed in one of the barrel and the at least one fastening portion, and
   wherein an insertion groove into which the insertion protrusion is inserted is formed in the other of the barrel and the at least one fastening portion.

9. The puddle lamp for the vehicle of claim 1, wherein the collimating unit comprises:
   at least one collimating lens; and
   a spacer for positioning the at least one collimating lens to be spaced apart from the light source unit at a predetermined interval, wherein the at least one collimating lens and the spacer are coupled to be prevented from being separated from each other.

10. The puddle lamp for the vehicle of claim 9, wherein a coupling groove is formed in one of the at least one collimating lens and the spacer, and
wherein a coupling protrusion inserted into the coupling groove is formed in the other of the at least one collimating lens and the spacer.

11. The puddle lamp for the vehicle of claim 9, wherein the at least one collimating lens comprises a plurality of collimating lenses arranged along a direction of the light generated from the light source unit, and
wherein the plurality of collimating lenses are disposed at both sides of a through-hole formed in the spacer.

12. The puddle lamp for the vehicle of claim 1, wherein the light source unit comprises:
a light source; and
a substrate on which the light source is installed,
wherein a guide rib for aligning an assembly position of the light source unit is formed in one of the holder and the substrate, and a guide groove into which the guide rib is inserted is formed in the other of the holder and the substrate, and
wherein the guide rib and the guide groove are formed to be spaced apart to one side with respect to a centerline that connects centers of opposite side ends of the substrate when the light source unit is assembled.

13. A puddle lamp for a vehicle comprising:
a collimating unit for collimating light emitted from a light source unit;
a logo mask having a predetermined pattern that includes a region through which the light is transmitted and a region through which the light is obstructed;
an image forming unit for forming an image corresponding to the pattern by the light that passes through the logo mask from the collimating unit; and
a holder in which the collimating unit and the image forming unit are assembled,
wherein the image forming unit comprises a lens assembly in which a plurality of lenses are stacked and assembled, the lens assembly comprising:
a first lens; and
a second lens disposed on and coupled to the first lens via at least one fastening portion that extends from the first lens,
wherein the collimating unit comprises:
at least one collimating lens; and
a spacer for positioning the at least one collimating lens to be spaced apart from the light source unit at a predetermined interval,
wherein the at least one collimating lens and the spacer are coupled to be prevented from being separated from each other,
wherein a coupling groove is formed in one of the at least one collimating lens and the spacer, and
wherein a coupling protrusion inserted into the coupling groove is formed in the other of the at least one collimating lens and the spacer.

14. The puddle lamp for the vehicle of claim 13, wherein the at least one collimating lens comprises a plurality of collimating lenses arranged along a direction of the light generated from the light source unit, and
wherein the plurality of collimating lenses are disposed at both sides of a through-hole formed in the spacer.

15. A puddle lamp for a vehicle comprising:
a collimating unit for collimating light emitted from a light source unit;
a logo mask having a predetermined pattern that includes a region through which the light is transmitted and a region through which the light is obstructed;
an image forming unit for forming an image corresponding to the pattern by the light that passes through the logo mask from the collimating unit; and
a holder in which the collimating unit and the image forming unit are assembled,
wherein the image forming unit comprises a lens assembly in which a plurality of lenses are stacked and assembled, the lens assembly comprising:
a first lens; and
a second lens disposed on and coupled to the first lens via at least one fastening portion that extends from the first lens,
wherein the light source unit comprises:
a light source; and
a substrate on which the light source is installed,
wherein a guide rib for aligning an assembly position of the light source unit is formed in one of the holder and the substrate, and a guide groove into which the guide rib is inserted is formed in the other of the holder and the substrate, and
wherein the guide rib and the guide groove are formed to be spaced apart to one side with respect to a centerline that connects centers of opposite side ends of the substrate when the light source unit is assembled.

* * * * *